(12) United States Patent
Panhelleux et al.

(10) Patent No.: US 6,655,561 B2
(45) Date of Patent: Dec. 2, 2003

(54) DEVICE COMPRISING A REMOVABLE SLIDING CENTRAL CONSOLE

(75) Inventors: Jérôme Panhelleux, Paris (FR); Thierry Marceau, Rueil-Malmaison (FR); Marie-Claire Feyel, Versailles (FR); Philippe Barre, Meru (FR); Laurent Carrencotte, Meru (FR); Jean-Pierre Morel, Meru (FR); Richard Reant, Meru (FR)

(73) Assignee: SAI Automotive Allibert Industrie, Nanterre (FR)

( * ) Notice: Subject to any disclaimer, the term of this patent is extended or adjusted under 35 U.S.C. 154(b) by 47 days.

(21) Appl. No.: 10/108,264

(22) Filed: Mar. 28, 2002

(65) Prior Publication Data

US 2002/0139824 A1 Oct. 3, 2002

(30) Foreign Application Priority Data

Mar. 30, 2001 (FR) .............................. 01 04355

(51) Int. Cl.⁷ ................................ B60N 3/12
(52) U.S. Cl. .................. 224/275; 224/281; 296/37.1; 296/37.8
(58) Field of Search ................. 224/275, 281, 224/539, 554; 296/37.8, 37.14, 37.1

(56) References Cited

U.S. PATENT DOCUMENTS

| | | | | |
|---|---|---|---|---|
| 2,576,385 A | * | 11/1951 | Bigsby | 296/37.1 |
| 3,004,678 A | * | 10/1961 | Golaski | 224/487 |
| 4,146,159 A | | 3/1979 | Hemmen | |
| 4,303,367 A | * | 12/1981 | Bott | 224/281 |
| 4,705,315 A | * | 11/1987 | Cherry | 296/37.1 |
| 6,135,529 A | * | 10/2000 | De Angelis et al. | 224/281 |
| 6,203,088 B1 | * | 3/2001 | Fernandez et al. | 296/37.8 |
| 6,416,143 B1 | * | 7/2002 | Janson | 312/201 |

FOREIGN PATENT DOCUMENTS

| | | |
|---|---|---|
| CA | 2245311 | 2/1999 |
| DE | 296 11 382 U1 | 12/1997 |
| FR | 2 789 641 A1 | 8/2000 |

* cited by examiner

Primary Examiner—Nathan J. Newhouse
(74) Attorney, Agent, or Firm—Rothwell Figg Ernst & Manbeck

(57) ABSTRACT

A device for the passenger compartment of a motor vehicle comprising a central console. The device, in addition to the central console, comprises a support intended to be fixed to the passenger compartment of the vehicle, and guide means comprising a rail and a carriage maintained with respect to the central console and to the support. The device further comprises releasable connection means having an active position and an inactive position in which they respectively maintain and release the assembly formed by the console and the guide means with respect to the support.

7 Claims, 5 Drawing Sheets

FIG_1

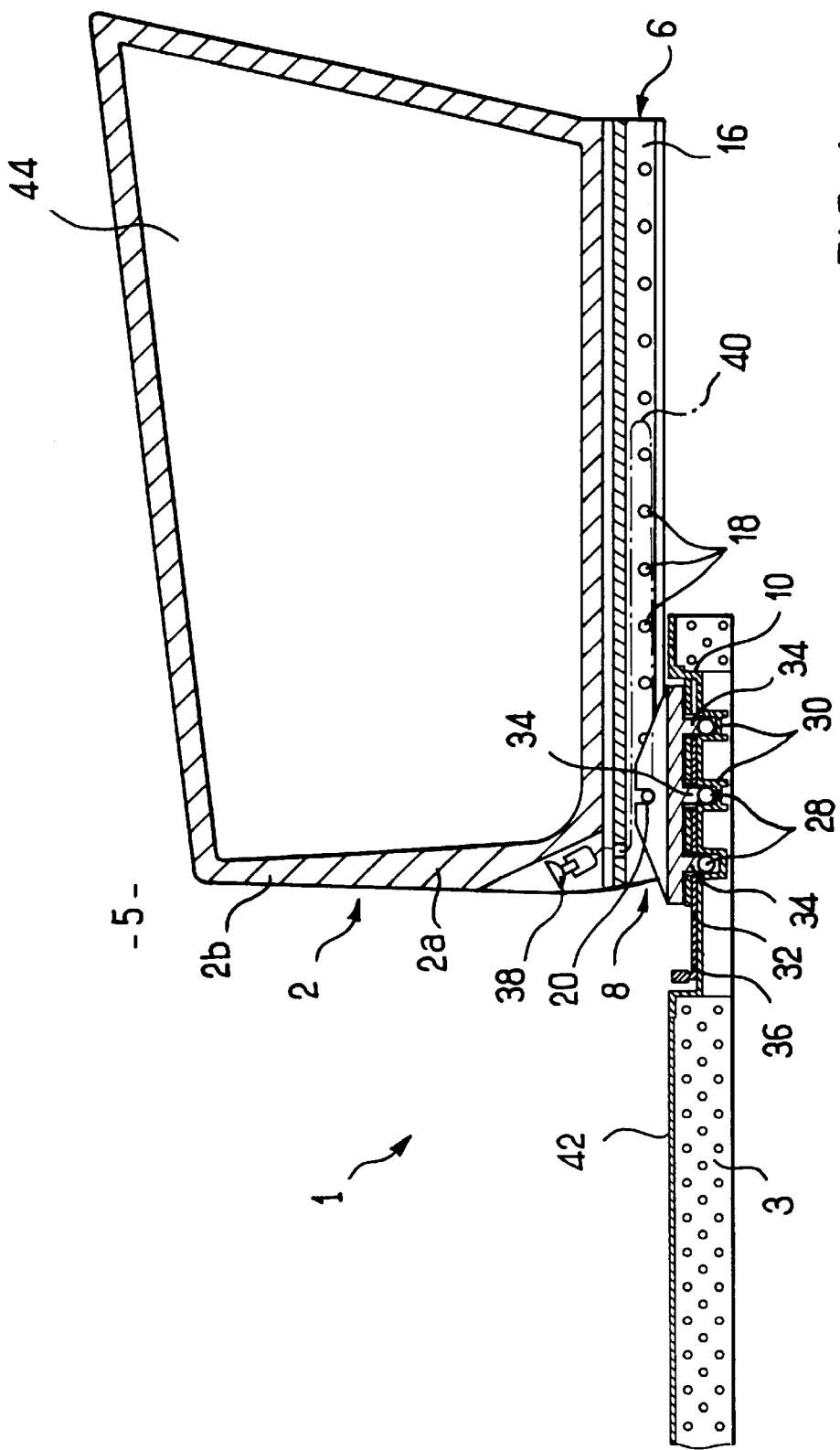
FIG_4

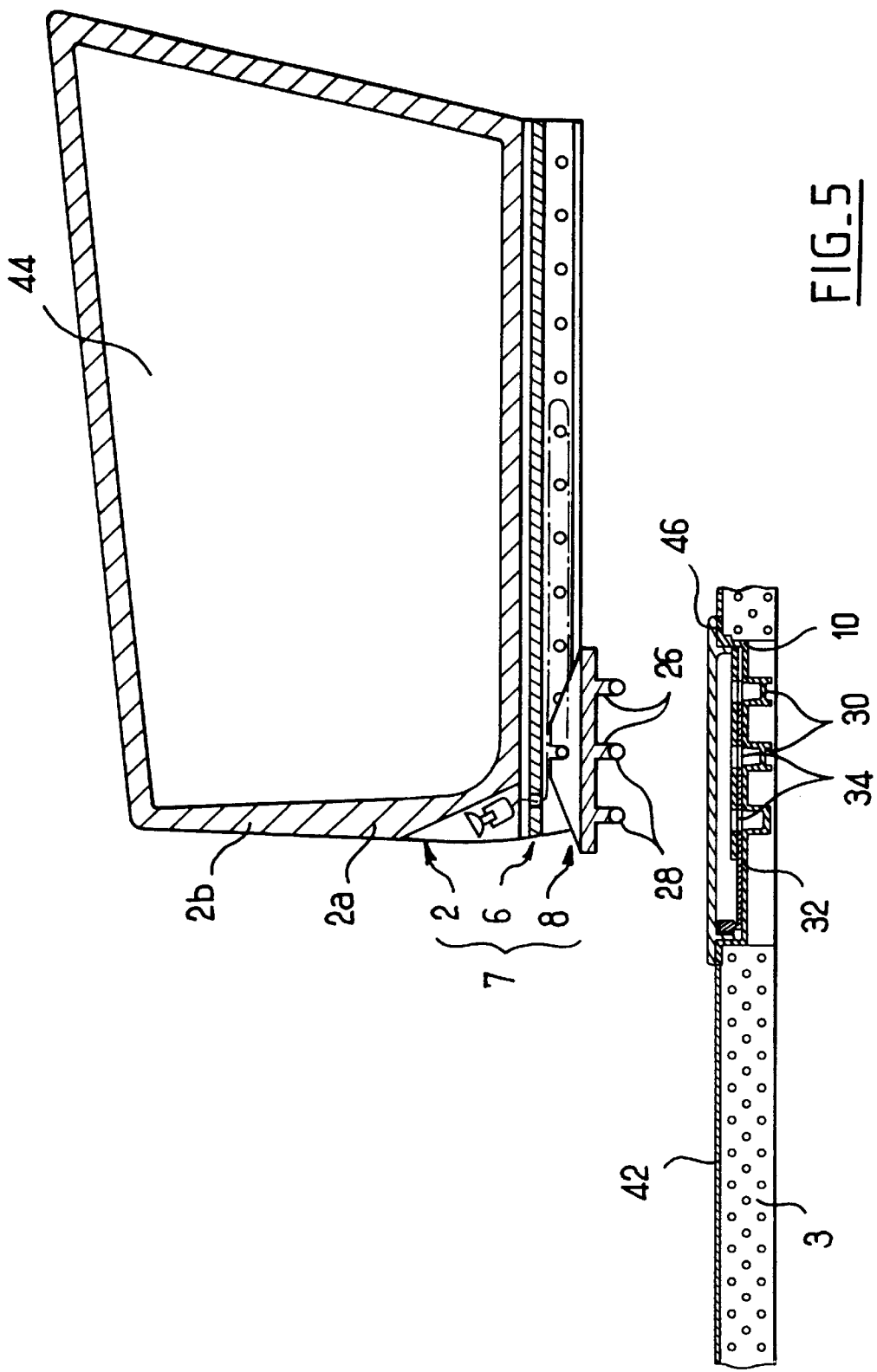
FIG_5

DEVICE COMPRISING A REMOVABLE SLIDING CENTRAL CONSOLE

BACKGROUND OF THE INVENTION

The present invention concerns a device for the passenger compartment of a motor vehicle comprising a central console.

Such a device, intended to be arranged between the seats, in particular between the front seats, serves especially for storage or support.

The document CA-A-2 245 311 describes such a device, comprising in addition to the central console a support intended to be fixed to the passenger compartment of the vehicle and guide means comprising a first portion maintained with respect to the central console and a second portion maintained with respect to the support, said portions being intended to slide relative to each other, and the one defining a rail forming a slideway and the other a carriage forming a slider. However, the central console is not intended to be removed from the passenger compartment of the vehicle, thus reducing its functionality.

FR-A-2 789 641 discloses a device further comprising releasable connection means disposed between the second portion of the guide means and the support. Said means have an active position in which they maintain the second portion of the guide means with respect to the support and an inactive position in which they release the assembly formed by the console and the guide means with respect to the support.

Thus, the console can not only slide but also be removed. Then only the support remains in place, constituted by the floor of the vehicle, such that there is no risk of damaging either the rail or the carriage. In addition, it is possible to place objects or to move easily in the area freed by the console.

However, the robustness of the device and the ease of placing the console in position in order to connect it to the support are not very satisfactory.

SUMMARY OF THE INVENTION

In order to remedy this, according to the invention the assembly has the following features:
- the rail is disposed between the carriage and the console, such that the releasable connection means maintain the carriage with respect to the support,
- the support has a hollow form intended to receive the carriage, and
- the device further comprises a flap intended to close off the hollow formed in the support when the assembly formed by the console, the rail and the carriage is away from the support.

By disposing the carriage in the support, the useful volume of the central console is increased, the support being able in fact to be advantageously embedded in a wall of the passenger compartment such as the floor.

Moreover, the carriage may be of greater thickness without reducing the useful volume of the central console, thus making it possible to increase the robustness of the device and/or the length of slide.

In addition, the hollow form of the support facilitates the installation of the console by inserting the carriage into said hollow. Finally, once covered by the flap, the support is integrated perfectly into the passenger compartment.

As another advantageous feature of the invention having the aim of maintaining the central console in a given position, the invention proposes that the device includes position indexing means comprising:
- a rib extending along the rail and having openings passing through it which are distributed over its length,
- an indexing rod connected to the carriage and controlled by an electric actuator displacing it between an active position in which it is inserted into the openings of the rib and an inactive position in which it allows sliding between the carriage and the rail,
- a control button connected to the actuator and intended to enable the user to allow or prevent sliding of the console with respect to the support.

This solution is reliable, robust, easy to use, requires almost no effort, and enables the control to be arranged ergonomically.

An advantageous solution proposed by the invention for connecting the console releasably to the support consists in that the releasable connection means comprise:
- retaining lugs fixed to the second portion of the guide means,
- seatings provided in the support and intended to receive said retaining lugs,
- a sliding bolt movable between an inactive position in which it provides an access opening to the seatings and an active position in which it closes off said seatings, in order to retain said retaining lugs in said seatings.

This simple and robust solution ensures reliable operation.

In order to avoid the involuntary release of the console and allow it to be replaced in position easily, the invention proposes that the releasable connection means comprise control means which allow the release of the console with respect to the support only in a specific relative position of said console with respect to said support.

Thus, since the position of the second portion of the guide means with respect to the console is always the same, correctly positioning the console will suffice to engage said second portion of the guide means in the support.

In order to improve the operation of the device further, the invention proposes that the rail be produced from aluminium alloy. It will thus be relatively light, able to incorporate reinforcing elements such as ribs, and exhibit little variation of dimensions without significant extra cost.

The invention will become even clearer from the following description, provided with reference to the appended drawings.

BRIEF DESCRIPTION OF THE DRAWINGS

FIG. 4 shows in a similar manner to FIG. 3 the device according to the invention with the central console in a rearward position, FIG. 5 shows in a similar manner to FIG. 3 the device according to the invention with the central console removed.

DETAILED DESCRIPTION OF THE PREFERRED EMBODIMENT

Figure 1:
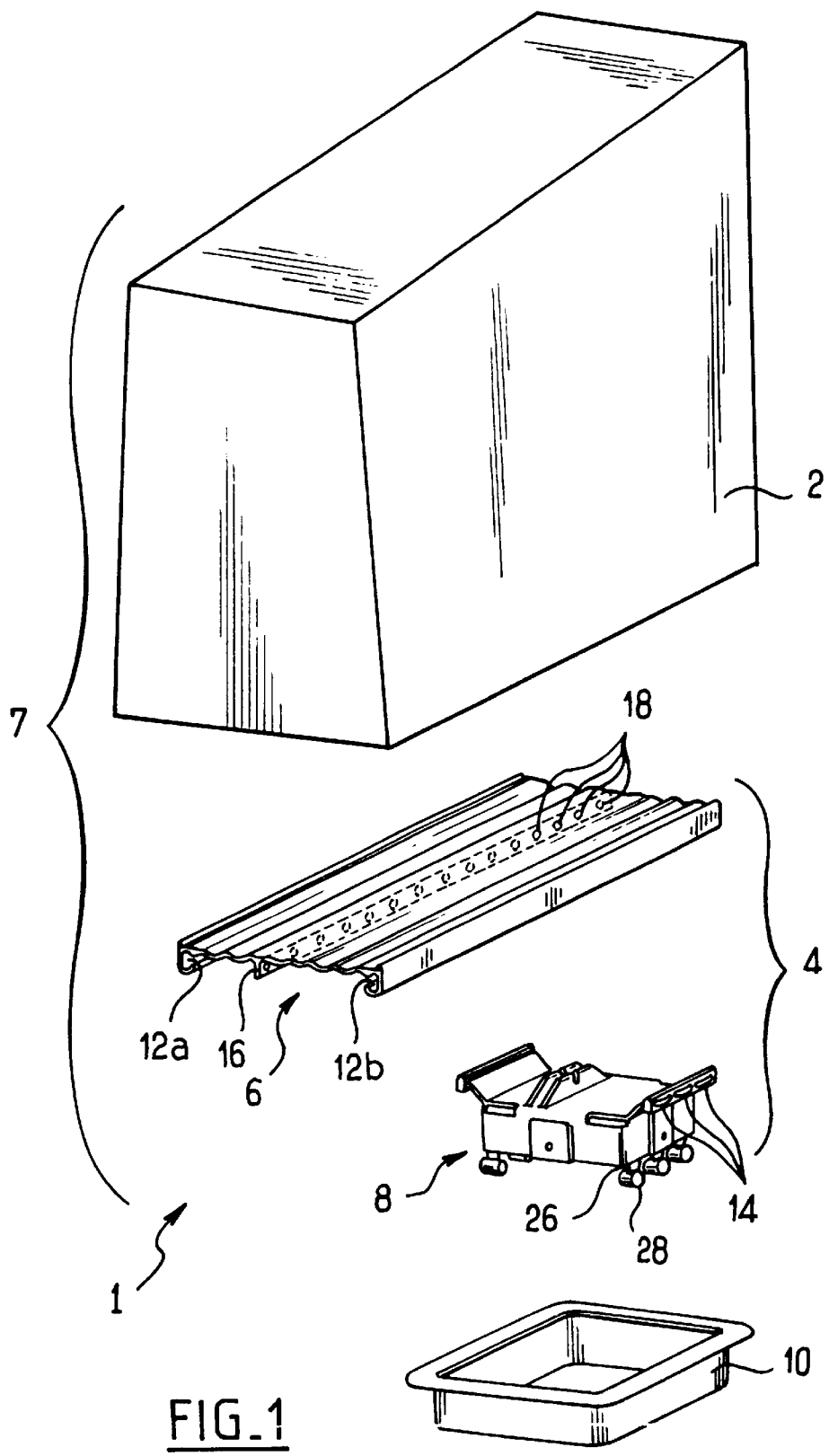
FIG. 1 shows in an exploded perspective view a device according to the invention.

As illustrated, the device 1 of the invention essentially comprises a central console 2, guide means 4 and a support 10 which are disposed in the passenger compartment 5 of a motor vehicle and are intended to be fixed to the floor 3 of said vehicle. The guide means comprise a rail 6 and a carriage 8, otherwise respectively termed generically a slideway 6 and a slider 8.

The rail 6 and the carriage 8 here form an assembly that cannot be dismantled. The rail 6 has two longitudinal grooves 12a, 12b extending along its lateral ends in each of which run rollers 14 connected to the carriage 8 by way of bearings, in this case needle bearings 15. In order to immobilise the carriage 8 with respect to the rail 6, said rail 6 has a longitudinal rib 16 pierced by a series of transverse holes 18 intended to receive a locking rod 20, the movement of which is controlled by an electric actuator 22. In order to make FIGS. 3 to 5 easier to understand, the actuator 22 has not been shown in those figures.

The rail 6, advantageously made of profiled aluminium alloy, extends substantially over the entire length of the console and is fixed underneath it by way of screws 24. The carriage 8 itself is intended to be received in the hollow formed by the support 10. It is removably connected to said support by way of lugs 26, six in number in this case. In fact, the retaining lugs 26 of the carriage are terminated by tubular protuberances 28 maintained by a locking plate 32 forming a sliding bolt in seatings 30 provided in the support 10.

Figure 2:
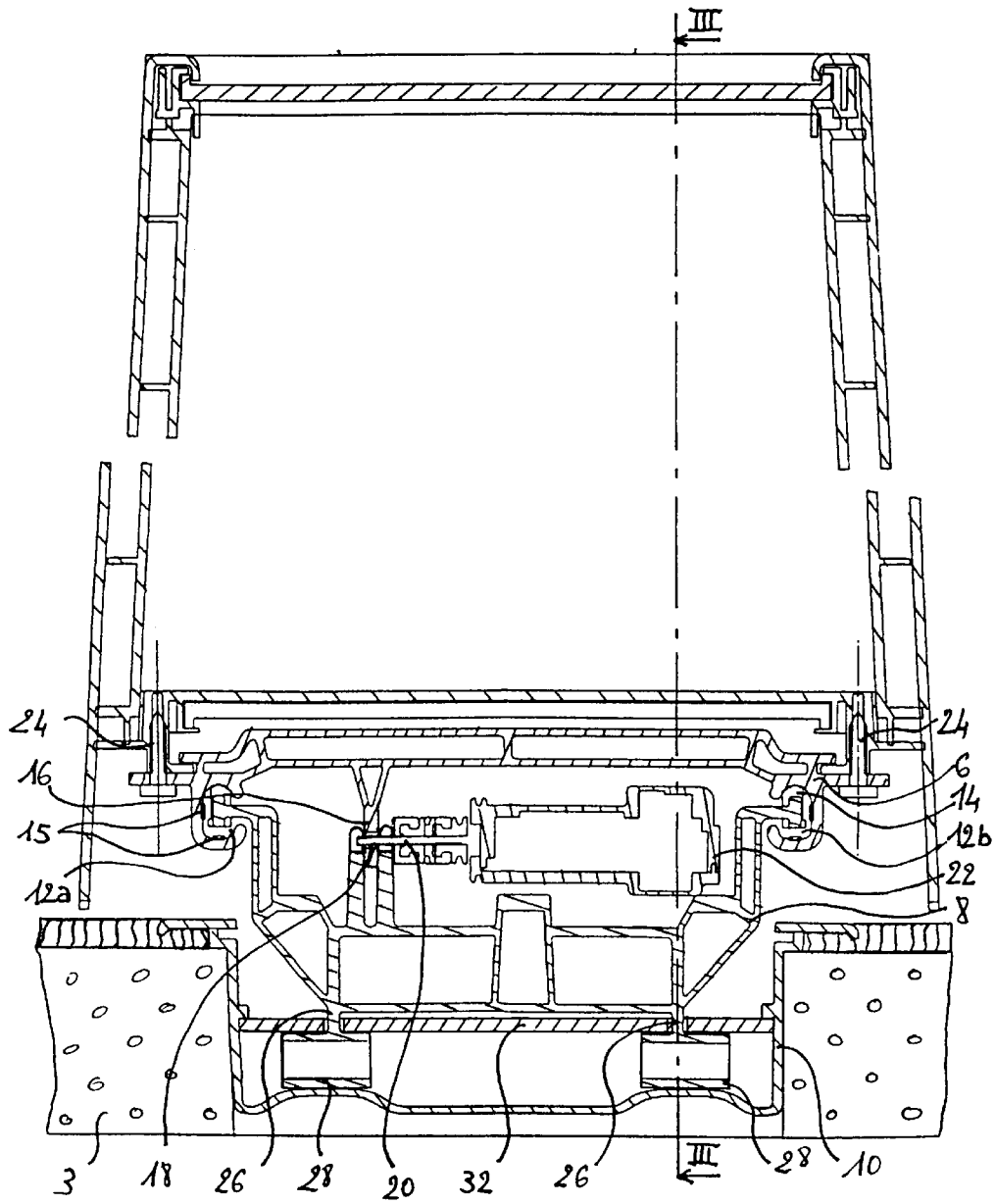
FIG. 2 shows the device of FIG. 1 in section along the transverse plane II—II in FIG. 3.
Figure 3:
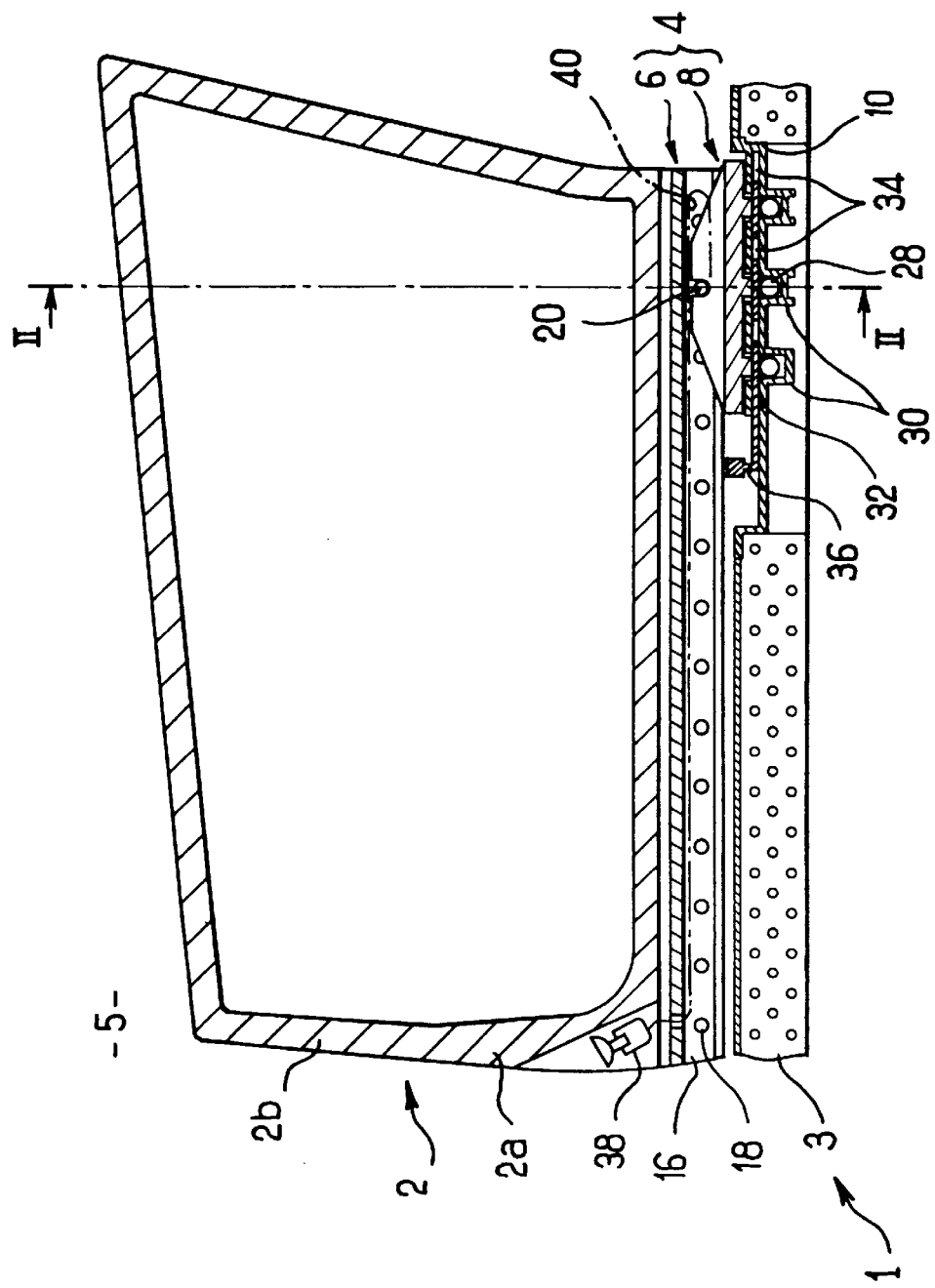
FIG. 3 shows, in section along the plane III—III in FIG. 2, the device according to the invention with the central console in a forward position.

The locking plate 32 has openings 34 of section substantially similar to that of the seatings 30 and slides with respect to the support 10 between an active position illustrated in FIGS. 1 to 3 and an inactive (retracted) position. In the active position of the locking plate 32, as illustrated in FIGS. 1 to 3, the openings 34 are offset with respect to the seatings 30, such that the plate 32 closes off the seatings 30. On the other hand, when the locking sliding bolt 32 is in the inactive position, as illustrated in FIGS. 4 and 5, the openings 34 are disposed opposite the seatings 30, thus releasing the protuberances 28 and consequently the assembly 7 formed by the console 2, the rail 6 and the carriage 8 (FIG. 5).

The movement of the locking plate 32 between its active position and its inactive position is controlled by way of a pull 36. When the console 2 is in the forward position, as illustrated in FIG. 3, the pull 36, disposed within the seating 10, is hidden beneath the rail 6 and the console 2, such that said console 2 cannot be separated from the support 10. On the other hand, by sliding the console 2 into the extreme rearward position, illustrated in FIG. 4, the user has access to said pull 36.

To slide the console 2, the user actuates a control button 38 which supplies the actuator 22 electrically by way of an electrically conducting sheet 40 (illustrated by dash/dotted lines) folded back onto itself in order to follow the relative movement between the console on which the control button 38 is fixed and the carriage 8 on which the actuator 22 is fixed. The actuator 22 then causes the withdrawal of the locking rod 20. After placing the console in the desired position, the user releases the control button 38 and the locking rod 20 is inserted into one of the holes 18 of the rail 6.

The device further comprises a flap 46 intended to cover the support 10 when the assembly 7 formed by the console and the guide means 4 are removed, as illustrated in FIG. 5. The floor 3 is then substantially flat, the top of the flap being located substantially at the same level as the floor covering 42.

The carriage 8 is advantageously produced from plastics material exhibiting good mechanical qualities, such as acrylonitrile butadiene styrene (ABS) or polyamide (PA), or from metallic material.

The carriage 8 generally has a length of about 10 to 15 centimeters and a guide length provided by the rollers 14 of approximately 10 to 15 centimeters. The rail 6 itself has a length of about 40 to 60 centimeters, like the central console 2.

The invention is of course in no way limited to the embodiment which has been described by way of non-limiting example. Thus, provision could be made to fix the rail to the support and to interpose the carriage between the console and the rail, although such an embodiment is considered to be less advantageous.

We claim:

1. A device in particular for the passenger compartment of a motor vehicle, comprising:
    a central console,
    a support intended to be fixed to the passenger compartment of the vehicle,
    guide means comprising a first portion maintained with respect to the central console and a second portion maintained with respect to the support, said portions being intended to slide relative to each other and the one defining a rail and the other a carriage,
    releasable connection means disposed between the second portion of the guide means and the support, said releasable connection means having an active position in which they maintain the second portion of the guide means with respect to the support, and an inactive position in which they release the assembly formed by the console and the guide means with respect to the support, said assembly being wherein:
    the rail is disposed between the carriage and the console, such that the releasable connection means maintain the carriage with respect to the support,
    the support has a hollow form intended to receive the carriage, and
    the device further comprises a flap intended to close off the hollow formed in the support when the assembly formed by the console, the rail and the carriage is away from the support.

2. The device according to claim 1, wherein it includes position indexing means for immobilising the console, comprising:
    a rib extending along the rail and having openings passing through it which are distributed over its length,
    an indexing rod connected to the carriage and controlled by an electric actuator displacing it between an active position in which it is inserted into the openings of the rib and an inactive position in which it allows sliding between the carriage and the rail,
    a control button connected to the actuator and intended to enable the user to allow or prevent sliding of the console with respect to the support.

3. The device according to claim 1, wherein the releasable connection means comprise:
    retaining lugs fixed to the second portion of the guide means,
    seatings provided in the support and intended to receive said retaining lugs,
    a sliding bolt movable between an inactive position in which it provides an access opening to the seatings and an active position in which it closes off said seatings, in order to retain said retaining lugs in said seatings.

4. The device according to claim 1, characterised in that the releasable connection means comprise control means which permit the release of the console with respect to the support only in a specific relative position of said console with respect to said support.

5. The device according to claim 4, characterised in that the control means for the releasable connection comprise a pull disposed beneath the console when said console is fixed to the support, such that said pull is accessible only in the end sliding position of the console.

6. The device according to claim 1, characterised in that the rail is made of aluminium.

7. The device according to claim 1, characterised in that the first portion of the guide means comprises two longitudinal grooves and the second portion of the guide means comprises rollers disposed within each groove.

* * * * *